United States Patent
Schneider

(10) Patent No.: US 11,906,304 B2
(45) Date of Patent: Feb. 20, 2024

(54) MAGNETIC LASER STUD FINDER

(71) Applicant: Trevor Schneider, Las Vegas, NV (US)

(72) Inventor: Trevor Schneider, Las Vegas, NV (US)

( * ) Notice: Subject to any disclaimer, the term of this patent is extended or adjusted under 35 U.S.C. 154(b) by 0 days.

(21) Appl. No.: 17/710,037

(22) Filed: Mar. 31, 2022

(65) Prior Publication Data

US 2023/0314134 A1 Oct. 5, 2023

(51) Int. Cl.
| | |
|---|---|
| *G01C 15/02* | (2006.01) |
| *G01C 15/00* | (2006.01) |
| *G01C 9/34* | (2006.01) |
| *G01V 3/08* | (2006.01) |

(52) U.S. Cl.
CPC ............ *G01C 15/004* (2013.01); *G01C 9/34* (2013.01); *G01V 3/08* (2013.01)

(58) Field of Classification Search
CPC ....... G01C 9/34; G01C 15/004; G01C 15/008
USPC ...................................................... 33/275 R
See application file for complete search history.

(56) References Cited

U.S. PATENT DOCUMENTS

| | | | | |
|---|---|---|---|---|
| 4,272,036 A * | 6/1981 | Watermann | ............ | B65H 75/16 242/405 |
| 6,532,676 B2 * | 3/2003 | Cunningham | ....... | G01C 15/008 33/286 |
| 6,745,485 B2 * | 6/2004 | Shor | ........................ | B44D 3/38 33/413 |
| 6,957,495 B1 * | 10/2005 | Schmillen | ................ | B44D 3/38 33/413 |
| 6,964,109 B1 * | 11/2005 | Bond | ....................... | B44D 3/38 33/1 LE |
| 7,161,343 B1 | 1/2007 | Biary | | |
| 7,287,336 B1 * | 10/2007 | Goodrich | ............... | G01C 15/12 33/286 |
| 7,756,665 B2 * | 7/2010 | Spanski | ................. | G01B 17/00 702/158 |
| 8,266,807 B2 * | 9/2012 | Olsen | ..................... | G01C 15/12 33/286 |
| 9,069,028 B2 | 6/2015 | Ebner | | |
| 9,464,895 B2 * | 10/2016 | Schubert | ................ | G01C 15/00 |
| 9,846,034 B2 * | 12/2017 | Hill | ....................... | G01C 15/004 |
| 10,071,594 B2 * | 9/2018 | Chernyshou | .............. | B44D 3/38 |
| 10,245,881 B2 * | 4/2019 | Khangar | .............. | B44D 3/38 |
| 10,507,689 B2 * | 12/2019 | Nosek | ..................... | B44D 3/38 |
| 11,156,736 B1 * | 10/2021 | De La Torre | ........ | G01C 15/004 |
| 11,307,032 B2 * | 4/2022 | Zhuang | ................ | G01C 15/008 |

(Continued)

FOREIGN PATENT DOCUMENTS

| | | |
|---|---|---|
| GB | 2584551 | 12/2020 |
| WO | 1998041817 | 9/1998 |

*Primary Examiner* — George B Bennett
(74) *Attorney, Agent, or Firm* — The Rapacke Law Group P.A.; Andrew S. Rapacke

(57) ABSTRACT

An article of manufacture for providing a magnetic laser stud finder according to the present invention is a magnetic laser stud finder including a device body having a first end, a second end, a top surface and a bottom surface, a cross beam laser device projecting from the first end, a pair of magnets coupled within the bottom surface of the device body, and a pair of float level devices coupled within the top surface of the device body. The pair of float level devices are configured to provide orthogonally positioned devices providing a horizontal level and a vertical level.

8 Claims, 6 Drawing Sheets

(56) References Cited

U.S. PATENT DOCUMENTS

| | | | |
|---|---|---|---|
| 11,554,605 B1* | 1/2023 | Fox | B44D 3/38 |
| 2002/0194744 A1* | 12/2002 | Shor | B44D 3/38 |
| | | | 33/414 |
| 2005/0076520 A1* | 4/2005 | Vary | B44D 3/38 |
| | | | 427/372.2 |
| 2015/0091553 A1 | 4/2015 | Wong | |
| 2018/0120099 A1* | 5/2018 | Apple | B66F 13/00 |
| 2019/0293826 A1 | 9/2019 | Barram | |
| 2022/0176733 A1* | 6/2022 | Wilson | B65H 75/406 |
| 2022/0196402 A1* | 6/2022 | Holloway | G01C 15/12 |
| 2022/0307835 A1* | 9/2022 | Basile | G01C 15/008 |
| 2023/0103815 A1* | 4/2023 | Roels | G01P 15/18 |
| | | | 73/493 |
| 2023/0119676 A1* | 4/2023 | Roudebush | G01C 15/105 |
| | | | 33/228 |

* cited by examiner

MAGNETIC LASER STUD FINDER

TECHNICAL FIELD

This application relates in general to an article of manufacture for providing a construction aid device, and more specifically, to an article of manufacture for providing a magnetic laser stud finder.

BACKGROUND

Contractors and Do-It-Yourselfers typically have a number of tools to find studs and level surfaces with a laser, useful for hanging items on a wall. No tool currently exists that combines 1. Level, 2. Cross beam laser device, and 3. Neodymium magnets into one compact, versatile device with multiple functions and uses.

Therefore, a need exists for an article of manufacture for providing a magnetic laser stud finder. The present invention attempts to address the limitations and deficiencies in prior solutions according to the principles and example embodiments disclosed herein.

SUMMARY

In accordance with the present invention, the above and other problems are solved by providing an article of manufacture for a magnetic laser stud finder according to the principles and example embodiments disclosed herein.

In one embodiment, the present invention is an article of manufacture for providing a magnetic laser stud finder. The magnetic laser stud finder including a device body having a first end, a second end, a top surface and a bottom surface, a cross beam laser device projecting from the first end, a pair of magnets coupled within the bottom surface of the device body, and a pair of float level devices coupled within the top surface of the device body.

In one aspect of the present invention, the pair of float level devices are configured to provide orthogonally positioned devices providing a horizontal level and a vertical level.

In another aspect of the present invention, the magnetic laser stud finder further includes batteries contained within a cavity within the device body, and a push button power switch electrically coupling the battery to the cross beam laser device, the push button power switch activates the cross beam laser device.

In another aspect of the present invention, the pair of magnets comprising two Neodymium magnets for detecting nails and screws securing the drywall to support studs.

In another aspect of the present invention, the two Neodymium magnets attach the magnetic laser stud finder to the wall without support from a user.

In another aspect of the present invention, the cross beam laser device projects light parallel to the horizontal level and perpendicular to the vertical level.

In another aspect of the present invention, the magnetic laser stud finder is coupled to a tripod.

In another aspect of the present invention, the magnetic laser stud finder further comprises a removable battery cover over the cavity within the device body.

The foregoing has outlined rather broadly the features and technical advantages of the present invention in order that the detailed description of the invention that follows may be better understood. Additional features and advantages of the invention will be described hereinafter that form the subject of the claims of the invention.

It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Referring now to the drawings in which like reference numbers represent corresponding parts throughout.

DETAILED DESCRIPTION

Figure 1:
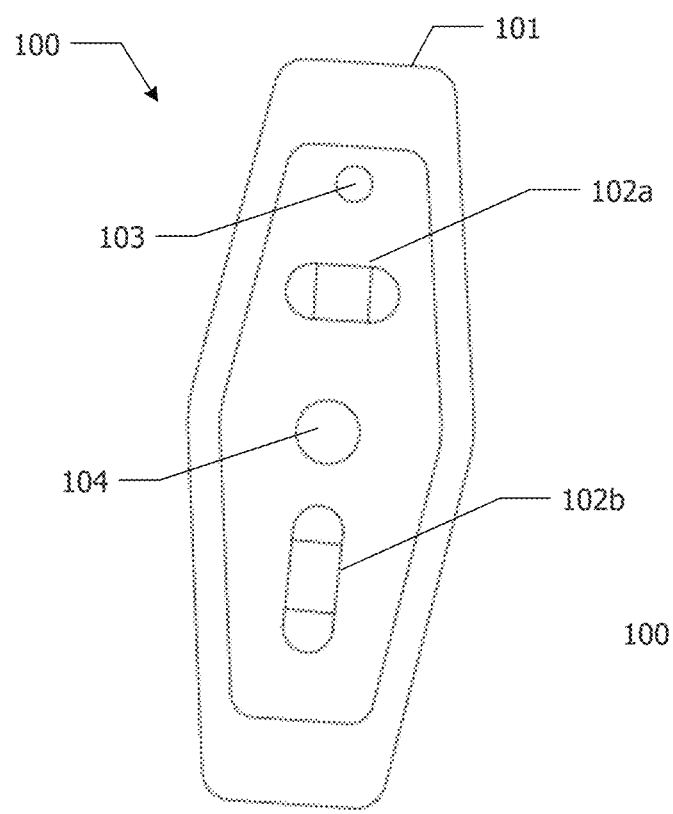
FIG. 1 illustrates an example embodiment of an article of manufacture providing a magnetic laser stud finder according to the present invention.

This application relates in general to an article of manufacture for providing a construction aid device, and more specifically, to an article of manufacture providing a magnetic laser stud finder according to the present invention.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In describing embodiments of the present invention, the following terminology will be used. The singular forms "a," "an," and "the" include plural referents unless the context clearly dictates otherwise. As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. As used herein, the singular forms "a," "an," and "the" are intended to include the plural forms as well, unless the context clearly indicates otherwise.

It further will be understood that the terms "comprises," "comprising," "includes," and "including" specify the presence of stated features, steps or components, but do not preclude the presence or addition of one or more other features, steps or components. It also should be noted that in some alternative implementations, the functions and acts noted may occur out of the order noted in the figures. For example, two figures shown in succession may in fact be executed substantially concurrently or may sometimes be executed in the reverse order, depending upon the functionality and acts involved.

The terms "individual" and "user" refer to an entity, e.g., a human, using an article of manufacture providing a magnetic laser stud finder according to the present invention. The term user herein refers to one or more users.

The term "invention" or "present invention" refers to the invention being applied for via the patent application with the title "Magnetic Laser Stud Finder." Invention may be used interchangeably with stud finder.

Figure 2:
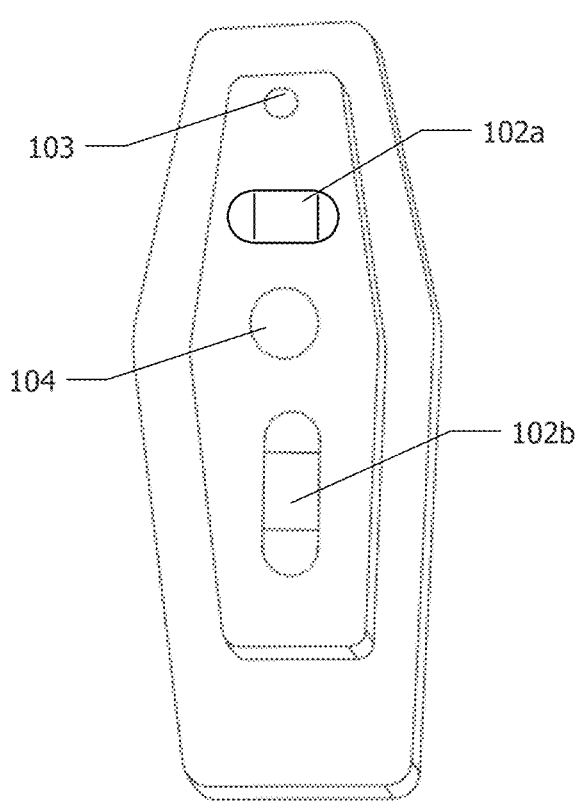
FIG. 2 illustrates an article of manufacture providing a magnetic laser stud finder according to the present invention.

In general, the present disclosure relates to an article of manufacture providing a magnetic laser stud finder according to the present invention. To better understand the present invention, FIG. 1 illustrates a top view of an example embodiment of an article of manufacture providing a magnetic laser stud finder 100 according to the present invention. Similarly, FIG. 2 illustrates a perspective view of an article of manufacture providing a magnetic laser stud finder 100 according to the present invention.

Figure 7:
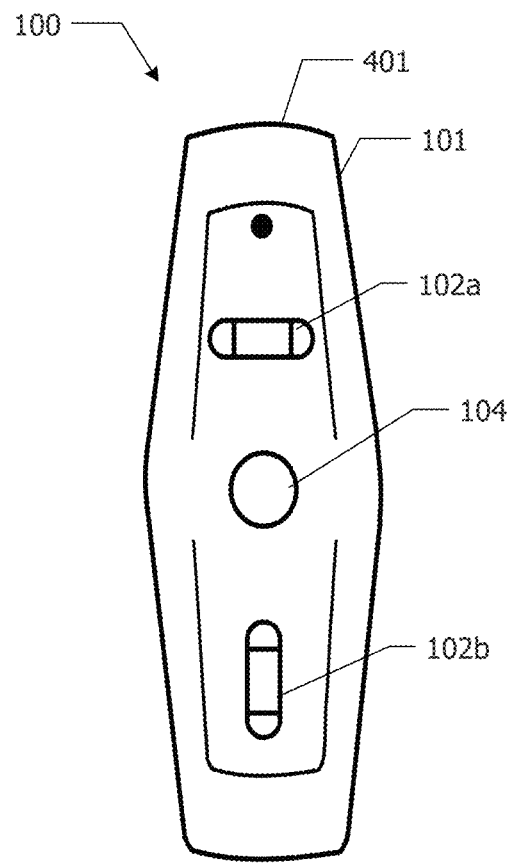
FIG. 7 illustrates another embodiment of an article of manufacture providing a magnetic laser stud finder according to the present invention.

The stud finder body 101 comprises a football-shaped device measuring 5"×1.8" with a cross beam laser device 312 projecting from one end with a push button power switch 103 to turn on/off. The laser device 312 is battery 311 operated. Two magnets 303a-b, as shown in FIG. 7, are positioned on a bottom surface 302 of the stud finder body 101 that may be used to magnetically attach to any metal surface, i.e. for finding studs in a wall by locating nails. Two small float ball level devices 102a-b are orthogonally positioned, with one horizontally and a second vertically, on a top surface 105 of the stud finder 100 for making certain the device is level and will cast a true level laser line.

This magnetic laser stud finder 100 combines a laser, a pair of float ball levels 102a-b, and magnets 303a-b into one unit for use in finding studs, hanging items, and other leveling methods. The devices most popular among many uses would be for finding studs in a wall, knowing the full length of the stud with use of the laser, and using the laser to project a level laser line for level placement of objects onto a wall.

A user will be able to detect the exact placement of a vertical stud in a wall by sliding the device along the wall surface until one of two Neodymium magnets 303a-b will detect a nail or screw used to secure the drywall. The magnetic laser stud finder 100 will stick to the wall via magnetic force, and this will disclose the stud. Once a stud is detected the magnetic laser stud finder 100 can be positioned by holding, tacking or a mark can be made perfectly centered using a through-hole 104 in the center of the stud finder body 101. The magnetic laser stud finder 100 can be turned on by easily pressing the push button that casts a laser along the surface of the wall. Then using the bubble levels 102a-b, a user can accurately adjust the magnetic laser stud finder 100 to level it and the laser device 312 will project a true vertical reading on the stud location within the wall. The magnetic laser stud finder 100 has vertical and horizontal bubble levels 102a-b that will allow accurate horizontal or/and vertical line measurements in any direction.

This magnetic laser stud finder 100 can be moved to any spot on a wall and rotated 45 degrees to cast a line with the laser device 312 horizontally. Using the bubble levels 102a-b, a true horizontal line can be cast along the wall and then marked accordingly for uses such as hanging pictures or objects. Objects that need to be hung will be easily matched to each other's height along a wall.

Other uses may include but are not limited to using the magnetic laser stud finder 100 to accurately cast a laser line or cross laser line from a distance against a surface to get an accurate and level reading. Leveling is most important when home building or remodeling. Such examples could include framing or building inside a home, kitchen and bathroom cabinetry, carpentry, electrical, tiling and masonry work.

Similar devices may include either a magnetic stud finder alone, or magnetic stud finders with levels, or a laser level with levels, but none combine 1. Levels, 2. Cross beam laser device, and 3. Neodymium magnets into a compact device with multiple functions and uses.

This stud finder device 100 also has a cross beam laser 312 that can be used on an existing tripod or be attached to a magnetic surface. When attached, the stud finder device 100 casts a cross laser beam out of its laser output port 401 onto a surface used for leveling that surface. Also, a hole in the center of the device permits marking the surface or tacking the device to the surface. Combining all the listed above functions in a single device is highly functional and operational and can solve the problem of not needing to use multiple devices for finding studs and having the ability to use a laser for hanging wall objects on a level plane.

Figure 3:
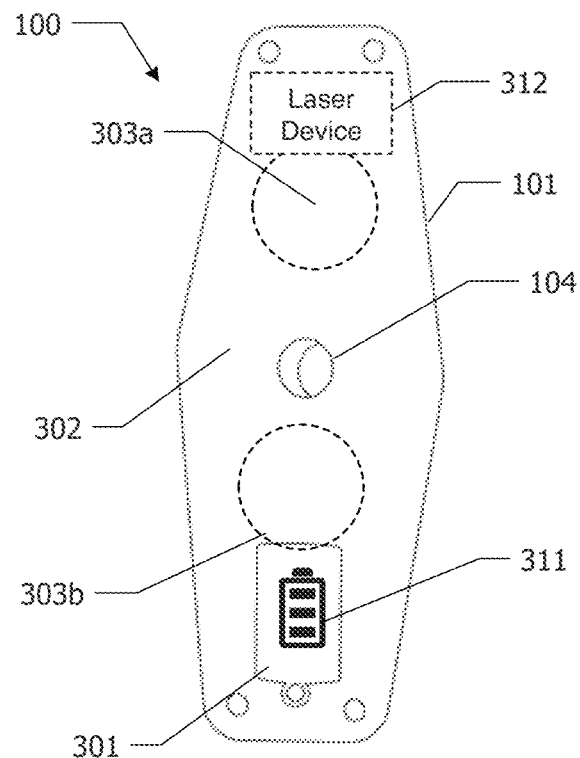
FIG. 3 illustrates a rear view of an article of manufacture providing a magnetic laser stud finder according to the present invention.
Figure 4:
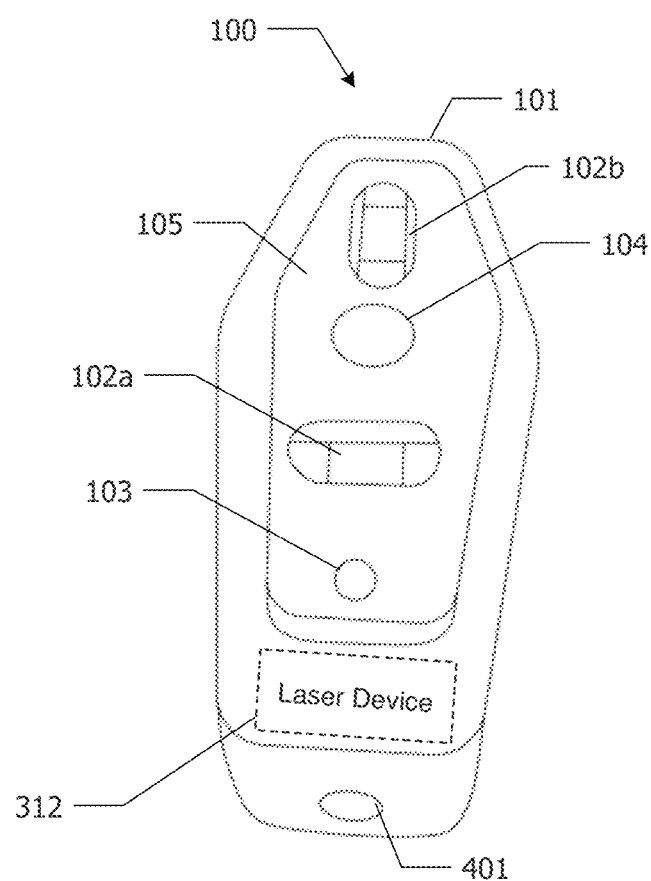
FIG. 4 illustrates a perspective view of an article of manufacture providing a magnetic laser stud finder according to the present invention.
Figure 11:
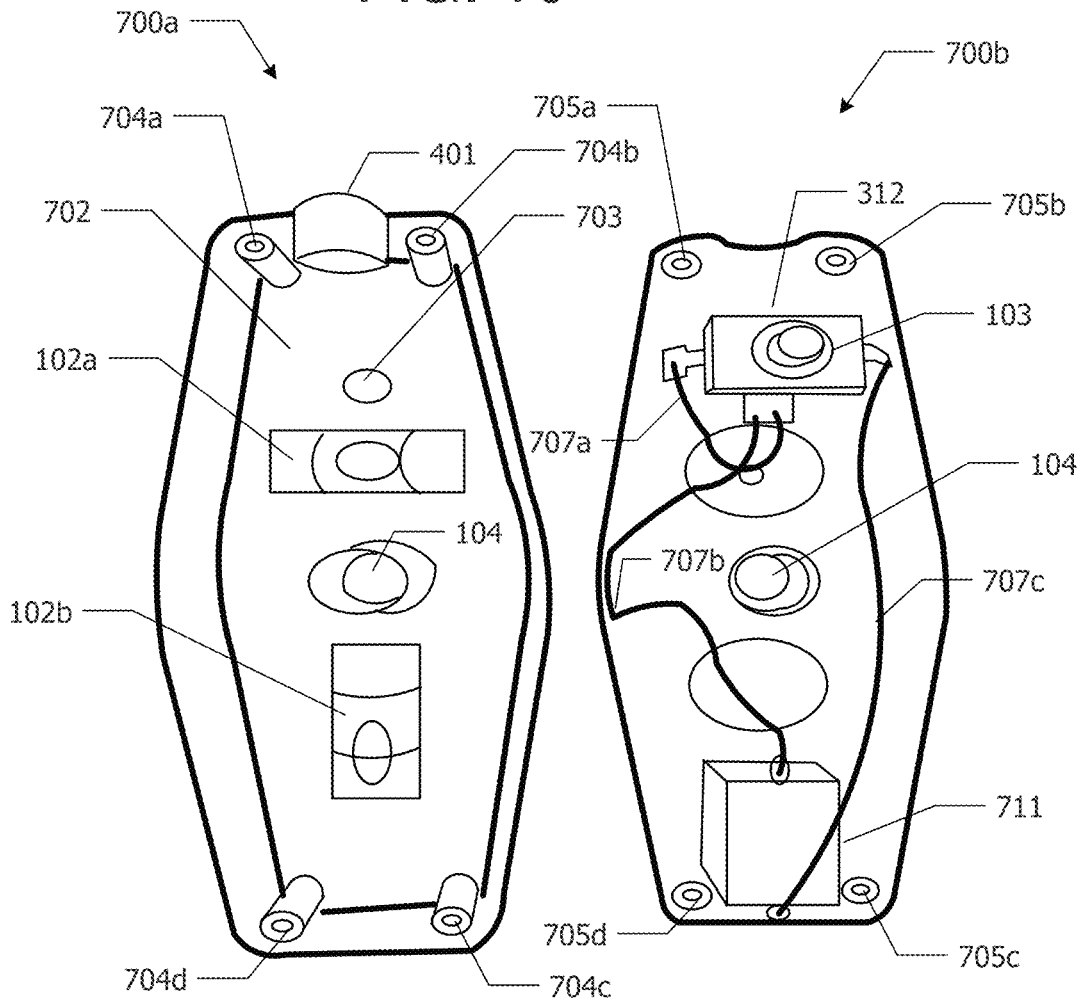
FIG. 11 illustrates component halves showing an inner cavity within the article of manufacture providing a magnetic laser stud finder according to the present invention.

FIG. 3 illustrates a rear view of an article of manufacture providing a magnetic laser stud finder according to the present invention Similarly, FIG. 4 illustrates a perspective view of an article of manufacture providing a magnetic laser stud finder according to the present invention. The laser device 312 is contained within an inside cavity 702, as shown in FIG. 11, of the stud finder body 101. The cavity is accessed by removing a battery cover 301 to insert and remove a battery 311 that powers the laser device 312. The battery cover 301 may be secured to the stud finder body 101 using a clip integral to the battery cover, a screw (not shown), or similar mechanism to couple the battery cover 301 to the stud finder body 101.

Figure 5:
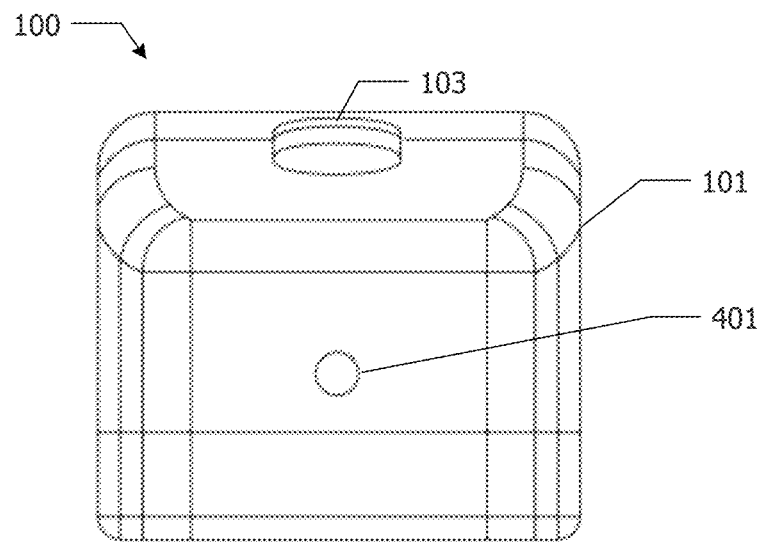
FIG. 5 illustrates an end view of an article of manufacture providing a magnetic laser stud finder according to the present invention.
Figure 6:
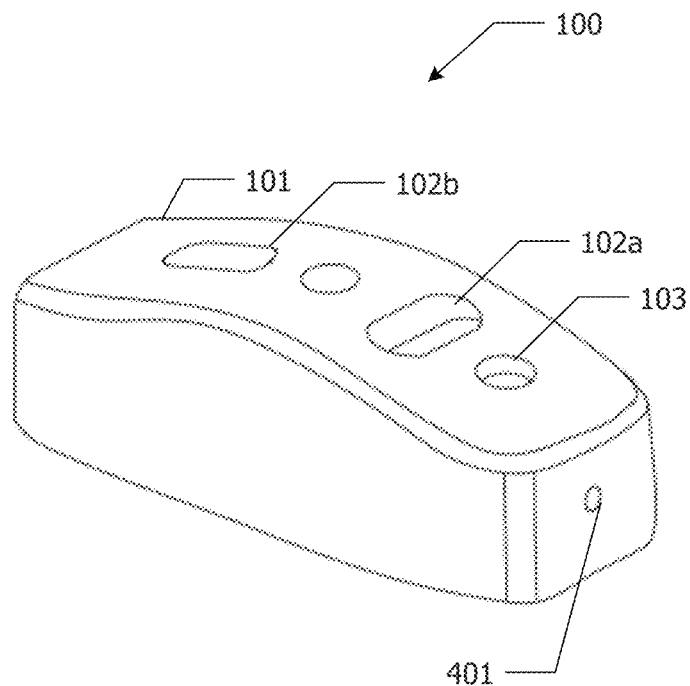
FIG. 6 illustrates a perspective sideview of an article of manufacture providing a magnetic laser stud finder according to the present invention.

FIG. 5 illustrates an end view of an article of manufacture providing a magnetic laser stud finder 100 according to the present invention. FIG. 6 illustrates a perspective sideview of an article of manufacture providing a magnetic laser stud finder according to the present invention. One end of the stud finder body 101 includes a laser output port 401 that is coupled to the laser device 311 within the stud finder body 101. The laser device 311 is configured to emit its laser out of the center of the laser output port 401 along a line parallel to a center line of the stud finder body 101. The power switch 103 is shown about the end of the stud finder body 101 closest to the laser output port 401 to simplify the electric circuit shown in FIG. 10 within the stud finder device 100. Of course, one of ordinary skill will recognize that the power switch 103 may be located on any surface of the stud finder device 100 to permit its use in an efficient manner.

FIG. 7 illustrates a top view of the embodiment of an article of manufacture providing a magnetic laser stud finder according to the present invention. The stud finder body 101 is shown with the pair of magnets 701*a-b* positioned at both ends of the stud finder body 101. A through hole is shown in the center of the stud finder body 101.

Figure 8:
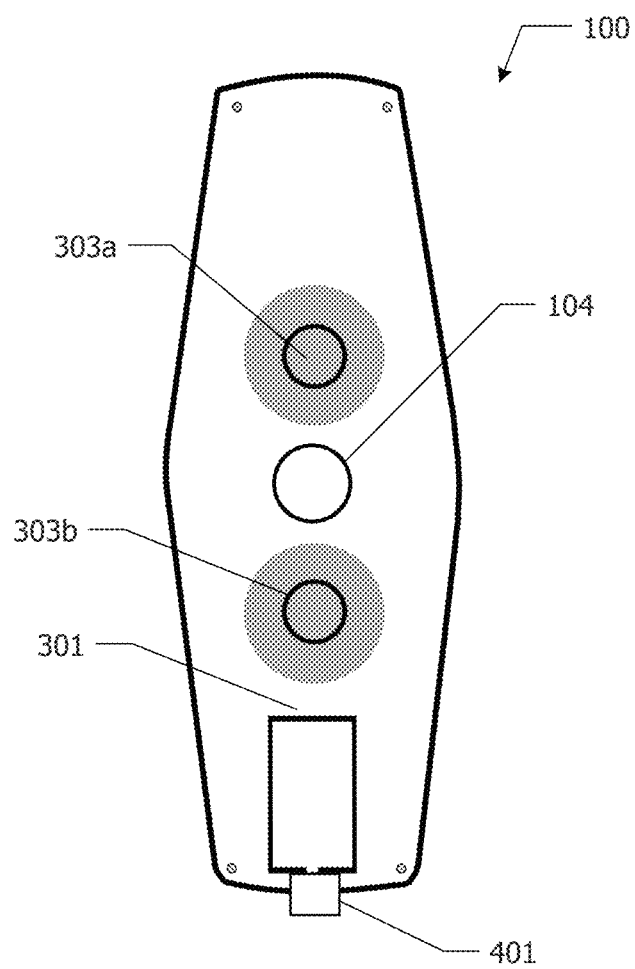
FIG. 8 illustrates a bottom view of another embodiment of an article of manufacture providing a magnetic laser stud finder according to the present invention.

FIG. 8 illustrates a bottom view of another embodiment of an article of manufacture providing a magnetic laser stud finder according to the present invention. The stud finder body 101 is shown with the through hole 104 along with the pair of orthogonal float ball level devices 102*a-b* positioned on either side of the through hole. A power switch 103 to engage the laser device within the stud finder body is positioned about the horizontal level device 102*a*. Depressing the power switch 103 electrically connects the battery to the laser device to cause the laser to emit from the laser output port 401. The power switch 103 may toggle an electrical contact switch between an open and a closed position in one embodiment. The power switch 103 also may electrically connect the battery to the laser device when the power switch 103 is depressed and open the electrical connection when the power switch 103 is released in a second embodiment.

Figure 9:
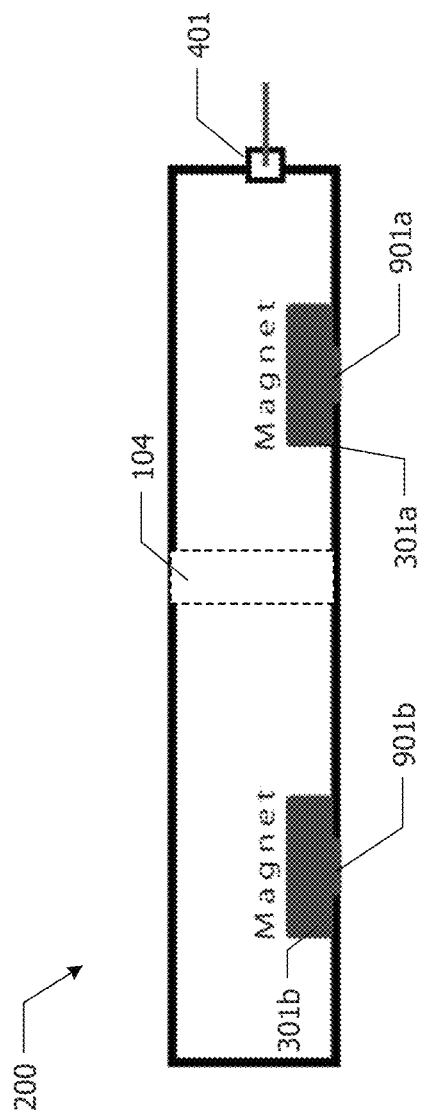
FIG. 9 shows a cutaway view of the article of manufacture providing a magnetic laser stud finder according to the present invention.

FIG. 9 shows a cutaway view of the article of manufacture providing a magnetic laser stud finder according to the present invention. The pair of magnets 301*a-b* are shown on opposite sides of the center through hole 104. Access holes 901*a-b* are positioned beneath the corresponding magnets 301*a-b* to provide these magnets with access to metallic objects in or on a wall to permit the magnetic laser stud finder 100 to attach and support the magnetic laser stud finder.

Figure 10:
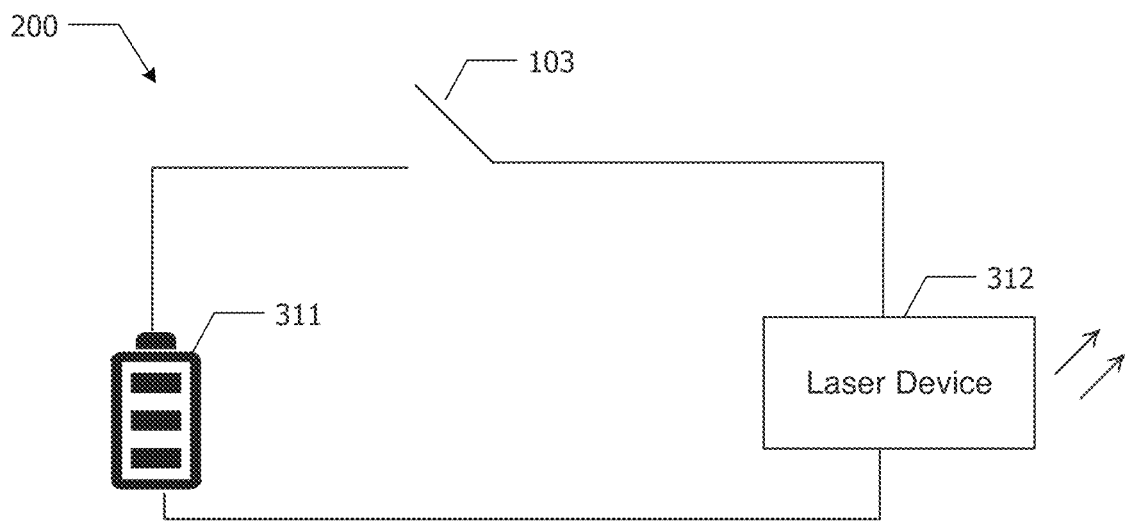
FIG. 10 illustrates a circuit schematic for electronic components within of an article of manufacture providing a magnetic laser stud finder according to the present invention.

FIG. 10 illustrates a circuit schematic for electronic components within of an article of manufacture providing a magnetic laser stud finder according to the present invention. The laser device 312 is electrically coupled to a battery 311 and a switch 103. When the switch 103 is depressed, the circuit 200 is active and the laser device 312 emits its light. In a preferred embodiment, the laser emitted from the laser output port 401 within the stud finder 100 is powered by 3 model 357 button batteries 312 in a preferred embodiment. The laser device may consist of a 650 mm wavelength laser in the preferred embodiment. The specific laser disclose is for exemplary purposes only. Other similar devices may be used as well. The example embodiment is not intended to limit the present invention except as defined within the limitations recited in the attached claims.

FIG. 11 illustrates component halves showing an inner cavity within the article of manufacture providing a magnetic laser stud finder according to the present invention. In the embodiment shown in FIG. 11, the magnetic laser stud finder 100 comprises two halves 700*a-b* that are coupled together using fasteners, such as screws, that pass through coupling holes 704*a-d* and engage mating holes 705*a-d* that are integrated within the two halves 700*a-b*. A top half 700*a* of the magnetic laser stud finder 100 provides an internal cavity 702 into which the electronic components of the magnetic laser stud finder 100 may be placed. The vertical and horizontal bubble levels 102*a-b* are shown coupled within the top half 700*a* of the magnetic laser stud finder 100. The laser output port 401 is coupled to a top edge of the top half 700*a*. The through hole 104 is shown in the center of both halves 700*a-b*.

A bottom half 700*b* is shown comprising the electrical circuit 200 of FIG. 10. A battery storage compartment 711 is shown at a bottom end of the bottom half 700*b* of the magnetic laser stud finder 100. One or more batteries 311 may be placed within the battery storage compartment 711 that is enclosed by the battery cover 301 shown in FIG. 3. The power switch 103 is integrated into the laser device 312 such that depressing the power switch 103 electrically connects the batteries 311 to the laser device 312. Electrical connection wires 707*a-c* connect the power switch 103, the laser device 312, and connection to the battery storage compartment 711. When the bottom half 700*b* is coupled to the top half of the magnetic laser stud finder 100, the electronic circuitry components are safely stored within the inner cavity 702 of the magnetic laser stud finder 100. In this orientation, the laser device 312 is configured to output the light through the laser output port 401.

Even though particular combinations of features are recited in the present application, these combinations are not intended to limit the disclosure of the invention. In fact, many of these features may be combined in ways not specifically recited in this application. In other words, any of the features mentioned in this application may be included in this new invention in any combination or combinations to allow the functionality required for the desired operations.

No element, act, or instruction used in the present application should be construed as critical or essential to the invention unless explicitly described as such. Further, the phrase "based on" is intended to mean "based, at least in part, on" unless explicitly stated otherwise.

What is claimed:

1. An article of manufacture providing a magnetic laser stud finder, the magnetic laser stud finder comprises:
   a device body having a first end, a second end, a top surface and a bottom surface;
   a cross beam laser device projecting from the first end;
   a pair of magnets coupled within the bottom surface of the device body; and
   a pair of float level devices coupled within the top surface of the device body.

2. The magnetic laser stud finder according to claim 1, wherein the pair of float level devices are configured to provide orthogonally positioned devices providing a horizontal level and a vertical level.

3. The magnetic laser stud finder according to claim 1, wherein the magnetic laser stud finder further comprises:
   a battery contained within a cavity within the device body; and
   a push button power switch electrically coupling the battery to the cross beam laser device, the push button power switch activates the cross beam laser device.

4. The magnetic laser stud finder according to claim 1, wherein the pair of magnets comprising two Neodymium magnets for detecting nails and screws securing the drywall to support studs.

5. The magnetic laser stud finder according to claim 4, wherein the two Neodymium magnets attach the magnetic laser stud finder to the wall without support from a user.

6. The magnetic laser stud finder according to claim 1, wherein the cross beam laser device projects light parallel to the horizontal level and perpendicular to the vertical level.

7. The magnetic laser stud finder according to claim 1, wherein the magnetic laser stud finder is coupled to a tripod.

8. The magnetic laser stud finder according to claim 2, wherein the magnetic laser stud finder further comprises a removable battery cover over the cavity within the device body.

* * * * *